United States Patent [19]

Bricot et al.

[11] 4,143,402

[45] Mar. 6, 1979

[54] SYSTEM FOR THE OPTICAL READ-OUT BY REFLECTION OF A DATA CARRIER USING HALF BEAMS

[75] Inventors: Claude Bricot; Jean C. Lehureau, both of Paris, France

[73] Assignee: Thomson-Brandt, Paris, France

[21] Appl. No.: 691,215

[22] Filed: May 28, 1976

[30] Foreign Application Priority Data

Jun. 3, 1975 [FR] France .................... 75 17262

[51] Int. Cl.$^2$ .................... H04N 5/76; G11B 7/12
[52] U.S. Cl. .................... 358/128; 179/100.3 V
[58] Field of Search .................... 358/128, 127; 179/100.3 V; 250/201, 202, 203 R; 340/173 LT, 173 LM; 365/120, 124, 215

[56] References Cited

U.S. PATENT DOCUMENTS

| | | | |
|---|---|---|---|
| 3,596,101 | 7/1971 | Someya | 250/204 |
| 3,876,841 | 4/1975 | Kramer et al. | 179/100.3 V |
| 3,969,576 | 7/1976 | Boonstra | 358/128 |
| 3,971,002 | 7/1976 | Bricot et al. | 340/173 LT |

*Primary Examiner*—Raymond F. Cardillo, Jr.
*Attorney, Agent, or Firm*—Cushman, Darby & Cushman

[57] ABSTRACT

The present invention relates to systems for the optical read-out, by reflection, of a data carrier. The present invention provides a read-out system in which two spots are projected which straddle the track being read-out. This method of projection makes use of a projection objective lens associated with an optical deflecting element in the form of a prism or a plate with parallel faces. The beam illuminating the track is split into two halves by a plane section containing the optical axis of the objective lens. The invention may be used for reading out data carriers upon which television signals are recorded.

18 Claims, 5 Drawing Figures

SYSTEM FOR THE OPTICAL READ-OUT BY REFLECTION OF A DATA CARRIER USING HALF BEAMS

The present invention relates to optical systems for the point read-out of a track carried by a data carrier and located in a recorded area of said carrier. The data carrier may for example take the form of a flexible or rigid disc equipped on at least one of its faces with an annular recorded area.

The track carrying the information may take the form of a spiral. In one known embodiment, the track is constituted by a string of elements of constant width but whose non-uniform lengths and spacings constitute the transcription, in the form of a relief impression or a non-uniform transparency, of a carrier waveform angularly modulated by said information. If the recorded information or data is in the form of television signals, the track will have a width the value of which is in the order of one micron and its turns will be arranged to have a pitch which is two to three times greater than that value.

For reading out the information carried by a data carrier, it is well known to illuminate the track point fashion by means of a light beam the point of convergence of which is maintained on the recorded area. Due to the transport of the data carrier and to the associated radial displacement of the read-out head, the read-out spot scans the track along the longitudinal axis thereof and the latter, by reflection, produces one or more modulated beams which are detected by photodetector elements. These latter elements are designed to furnish the requisite read-out signals as well as error signals respectively measuring defocusing of the read-out spot and its tracking departure in relation to the axis of the track portion being read-out.

In the read-out systems thus far known, the read-out head comprises a radiation source such as a laser, a projection objective lens and an arrangement of means which makes it possible not only to read-out the recorded signal but also to follow the track and to keep the point of convergence of the read-out beam in coincidence with the recorded area of the data carrier.

This assembly of means comprises several optical elements, several photodetector elements and also motor elements which are capable of displacing the point of convergence of the read-out beam in relation to the track, under the control of corrective electrical signals emanating from the photodetector elements.

One drawback of the prior art systems used for the purpose of optical read-out by reflection, is that a large number of components are needed in order to perform the read-out function proper and to furnish the tracking signals. Another drawback of known read-out systems is the optical coupling linking the mirror delimiting the laser cavity used as source, and the recorded area which itself does duty as a mirror. The optical cavity effect which results from this arrangement, gives rise to unwanted stationary wave phenomena and the result is that the luminous intensity received by the data carrier fluctuates in an unwanted way.

In order to overcome these drawbacks, the invention proposes that there be associated with the projection objective lens an optical deflecting element with flat principal faces, which cooperates with at least one half of its aperture in order to split the track illumination into two separate spots which embrace the track edges.

In accordance with the present invention, there is provided an optical system for the read-out, by reflection, of a data carrier which comprises within a recorded area a track of substantially constant width along which a physical characteristic of said data carrier is modulated in accordance with a signal carrying said information, said system comprising: a radiation source supplying radiation, an objective lens arranged for causing said radiation to converge on said track, photodetectors means provided for detecting at least a fraction of said radiation reflected by said recorded area and picked up by said objective lens; said system further comprising: an optical deflecting element with flat principal faces, transmitting at least one of the halves of the illuminating beam delimited by the aperture of said objective lens; said halves being obtained through splitting said illuminating beam with a plane of section containing the optical axis of said objective lens; said optical deflecting element causing the splitting of the illumination supplied to said recorded area, into two separate read-out spots; said read-out spots, during the transfer of said data carrier, scanning bands which are separated from one another by a distance smaller than said width.

For a better understanding of the present invention and to show how the same may be carried into effect reference will be made to the ensuing description and the attached figures among which:

Figure 4:
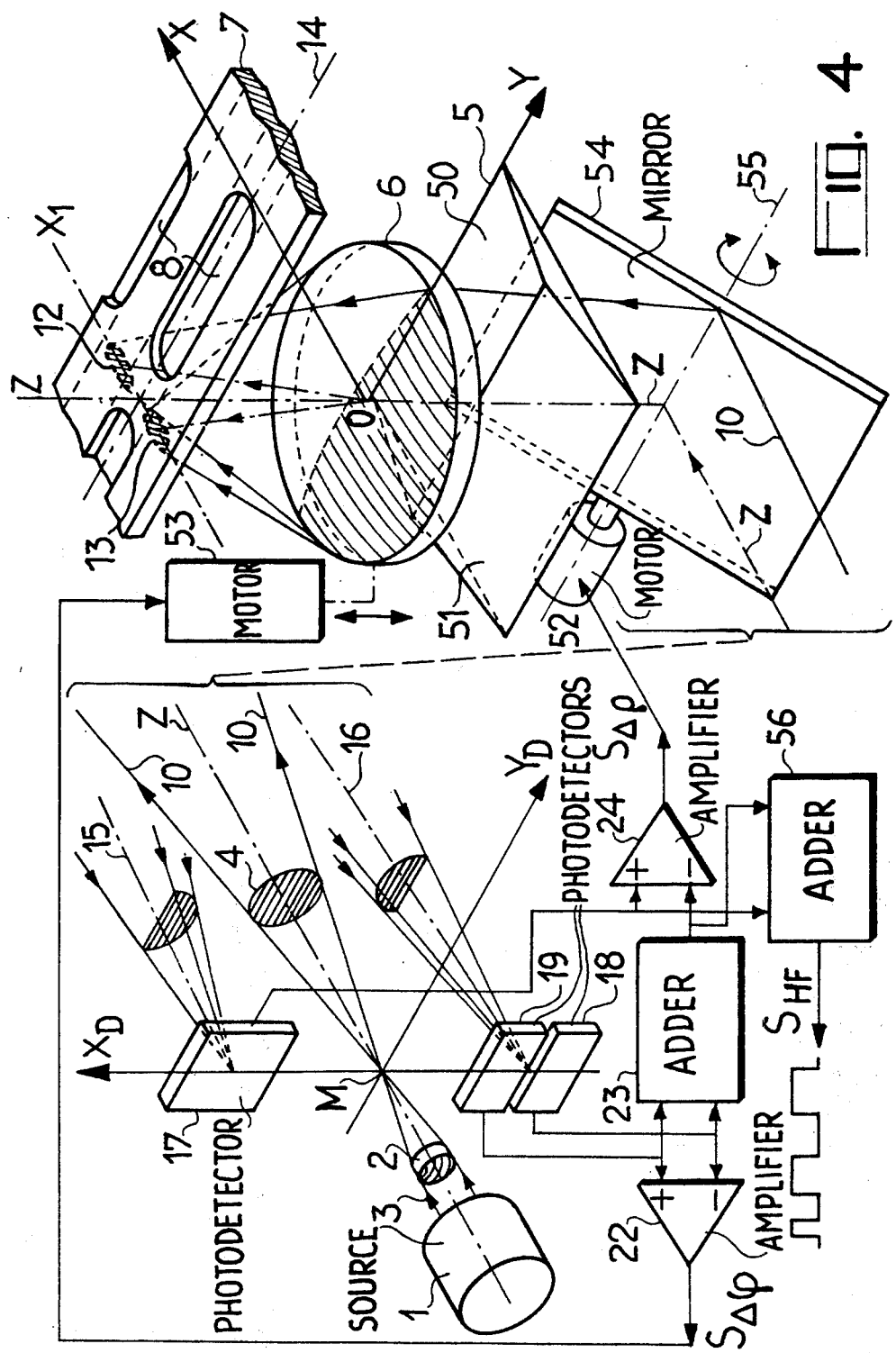
FIG. 4 illustrates a third variant embodiment of the optical read-out system in accordance with the invention.

In the ensuing description, by way of non-limitative example non folded optical diagrams have been adopted in order to simplify the illustration. However, it is possible, as FIG. 4 shows, particularly well, to arrange between the radiation source and the projection objective lens, a mirror which makes it easier to house the system in the housing of a read-out turn table. Similarly, in order to clarify matters, the figures omit the means used to displace the point of convergence of the read-out beam under the control of electrical signals. By way of non-limitative example, said point of convergence may be displaced along the optical axis of the objective lens by displacing said lens in said direction with the help of an electromechanical transducer connected to its mount. The displacement of the point of convergence transversely in relation to the longitudinal axis of the track can be effected by means of an oscillating mirror arranged between the source and the objective lens; the axis of pivot of said mirror can be controlled by another electromechanical transducer in the manner shown in FIG. 4.

Returning now to FIG. 1, there can be seen a fragment of a data carrier 7 upon which there have been shown two track sections in the form of microscopic depressions arranged in a string. This data carrier 7 will belong for example to a reflective disc having an axis of rotation 25. In this case, the longitudinal axis 14 of the track 8 is arranged perpendicularly to the radius $\rho$ and, during read-out, the disc executes a rotary motion at constant speed in the direction indicated by the arrow 26. The other elements shown in FIG. 1 form part of a read-out head whose optical axis is arranged for example in the direction of the axis of rotation 25. During rotation of the disc 7, the read-out head experiences a radial translatory motion in order to follow the track 8 which is of spiral form.

The optical axis of the read-out head is coincidental with the optical axis of a projection objective lens 6 whose optical centre is defined by the point 0. The aperture of the objective lens 6 is contained in a plane XOY perpendicular to the axis Z and substantially parallel to the recorded area containing the track 8. The read-out head comprises a radiation source 1 associated with a convergent lens 2 which focusses the emergent radiations 3 on the axis Z at the point M. The plane of coordinates $X_D Y_D$ passing through the point M, is a detection plane containing a point light source. This detection plane is rendered conjugate, by the objective lens 6, with the recorded area of the data carrier 7 if the latter is located at the ideal read-out distance. The conical illuminating beam emerging from the point M will for example have a circular section 4. It can be split into a half-beam 10 located above the plane ZOY and into a half-beam 11 located below the plane ZOY. The bottom half-beam 11 illuminates the bottom half of the circular aperture of the objective lens 6 and converges in the form of a read-out spot 13 whose centre is located on the axis Z. The shape of the spot 13 is obviously not circular, since it is projected from a radiant aperture of non-circular shape, but its width measured along the axis 14 of the track is nevertheless as small as if it had been projected by the whole of the aperture of the objective lens 6. The read-out spot 13 therefore has an oblong shape the major axis of which is the axis $X_1$ parallel to that OX, and the minor axis of which is the axis $Y_1$ parallel to that OY. The angle α made between the longitudinal axis 14 of the track 8 and $OY_1$, is substantially less than 90°. Thus, fine read-out of the information carried by the track 8 remains of good quality despite the fact that only half of the objective lens 6 is effective in focusing the spot 13.

Figure 1:
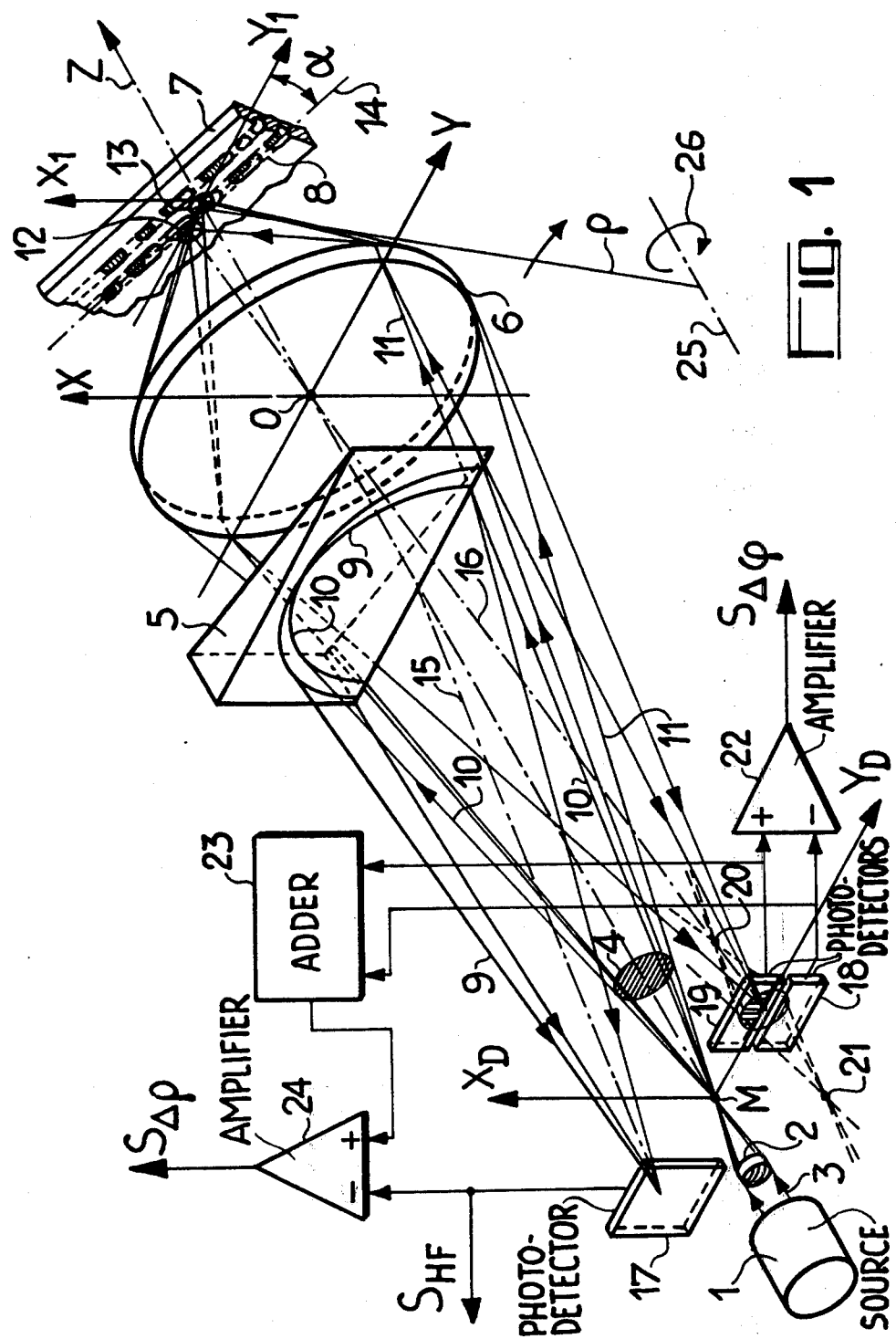
FIG. 1 is an isometric view of an optical system for read-out by reflection, in accordance with the invention.

The top half-beam 10 illuminates the top half of the aperture of the objective lens 6 after having been transmitted by a refractive element with flat principal faces, 5. Said element 5, in FIG. 1, is a prism which slightly deflects the top half-beam 10. The focusing of the top half-beam 10 takes place in the form of a second read-out spot 12 completely separate from that 13 but also having an oblong shape. The spots 12 and 13 are aligned in the direction $Y_1$ because the dihedral angle made by the principal faces of the prism 5 has its apex perpendicular to the plane ZY. The inclination α given to the axis of the track is such that the spots 12 and 13 straddle the track 8, partially overlapping its edges. The bands scanned on the recorded area, by the spots 12 and 13, are therefore separated by a distance of less than the width of the track 8.

Hitherto, we have seen how the radiation issuing from the source was split by the optical deflecting element 5 into two fractions each of which illuminates the recorded area of the data carrier 7 in virtually point fashion. In view of the fact that the recorded area can be likened, locally, to a flat mirror, it is now possible to follow the return trajectories of the reflected radiation. The reflected radiation fraction emerging from the track portion illuminated by the spot 12, comprises a non-diffracted component of zero order. This latter component reaches the bottom half of the aperture of the objective lens 6 and consequently, in the detection plane $X_D Y_D$, forms an image 6 and then forms in the detection plane $X_D Y_D$ an image of the point source M, said image being located upon the axis $Y_D$ opposite M for an observer looking in the direction of the objective lens 6. The reflected radiation fraction emerging from the track portion illuminated by the spot 13 also comprises a component of zero order which encounters the top part of the aperture of the objective lens 6.

This reflected component is returned to the prism 5 which, in turn, passes it onto the detection plane $X_D Y_D$ in the form of a beam 9. An image of the point source M therefore forms at the left hand side of the axis YD. Finally, the optical combination comprising the prism 5, the objective lens 6 and the reflective data carrier 7, forms two images of the point M thus located respectively at the left and the right of the point M.

If the mean direction of the incident beam coincides with the axis Z, then after retraversing this optical combination, mean directions of emergence 15 and 16 are obtained which are distinct from the direction of the axis Z. Thus, due to the spatial decoupling of the beams, no optical cavity can be formed between the emissive face of the source 1 and the recorded area of the data carrier 7.

Hitherto, it has been assumed that the recorded area of the data carrier 7 was rendered optically conjugate, by the objective lens 6, with the detection plane $X_D Y_D$. This leads to the formation, in the detection plane, of sharp images of the point source M. In fact, if we consider one of the two beams returned by the optical assembly 5, 6, 7, and if we assume that the data carrier 7 is moving away from the objective lens 6, then it will be seen that the sharp image of the point M forms in front of the detection plane. In the detection plane, an illumination in the form of a blurred spot is formed, which takes the form of a half-circle. In the case of the return beam 16, the sharp image is at the point 20 and the half-circle in question is located above the axis YD. Similarly, if the data carrier 7 has moved closer to the objective lens 6, the sharp image forms behind the detection plane at the point 21, and it is the blurred spot of semi-circular shape which is located beneath the axis YD, which must be taken into consideration.

This situation as far as errors of adjustment are concerned, makes it possible to readily measure the defocusing Δφ of the read-out beam in relation to the data carrier 7. To this end, in the detection plane two adjacent photodetector elements 18 and 19 are provided, which, for example, receive the radiation returning from the area illuminated by the spot 12. The line separating the photodetectors 18 and 19 is coincidental with the axis YD and these detectors are respectively connected to the plus and minus inputs of a differential amplifier 22. At the output terminals of the amplifier 22, a signal S Δφ is obtained representing the defocusing Δφ.

To measure the error of tracking Δρ in the read-out beam in relation to the longitudinal axis 14 of the track 8, it is necessary to measure the respective intensities of the two return beams 15 and 16. To this end, in the detection plane $X_D, Y_D$ a third photodetector element 17 is arranged which picks up the radiation contained in the return beam 15. By connecting to an adder circuit 23 the outputs of the photodetector elements 18 and 19, an output signal is obtained which represents the greater or lesser degree of overlap of the track 8 by the spot 12. This signal is applied to one of the inputs of a differential amplifier 24. The other input of the amplifier 24 is fed with the signal furnished by the transducer element 17 and representing the greater or lesser degree of overlap of the track 8 by the spot 13. The output signal S $\Delta\rho$ of the amplifier 24 is therefore a function of the error $\Delta\rho$ which characterises the displacement of the read-out spots in relation to the track.

It should be pointed out that the photodetector elements 17 may also be replaced by two photodetector elements associated with an adder circuit and with a differential amplifier. In other words, the characteristics of the two return beams 15 and 16 are similar, with the exception of the fact that the semi-circular section of one of them is the complement of the semi-circular section of the other. As far as the read-out signal $S_{HF}$ proper is concerned, it will be seen, from a consideration of FIG. 1, that this is available at any of the inputs of the differential amplifier 24. However, since the read-out spots 12 and 13 read the information carried by the track 8 with a certain spatial shift, only one of the two spots 12 and 13 is effectively utilized to read-out the information.

The servo signals S $\Delta\phi$ and S $\Delta\rho$ comprise high-frequency components of the read-out signal $S_{HF}$. If these components have a disturbing effect, they can be eliminated by means of low-pass filters connected to the respective outputs of the amplifiers 22 and 24.

The read-out head shown in FIG. 1 makes it possible to project a read-out spot 13 whose centre is located upon the optical axis of the objective lens 6. The other read-out spot 12 is projected off the optical axis due to the deflecting effect of the prism 5. If the interval between the spots 12 and 13 substantially exceeds the track width, and this is useful in order to reduce the angle $\alpha$ for obtaining the sharpest possible read-out, the field curvature of the objective lens 6 results in the two points of convergence not being located at the same distance from the plane XOY. This discrepancy can be taken account of by slightly inclining the read-out head in relation to the data carrier 7 so that the two points of convergence are both effectively located in the recorded area containing the track 8.

Figure 2:
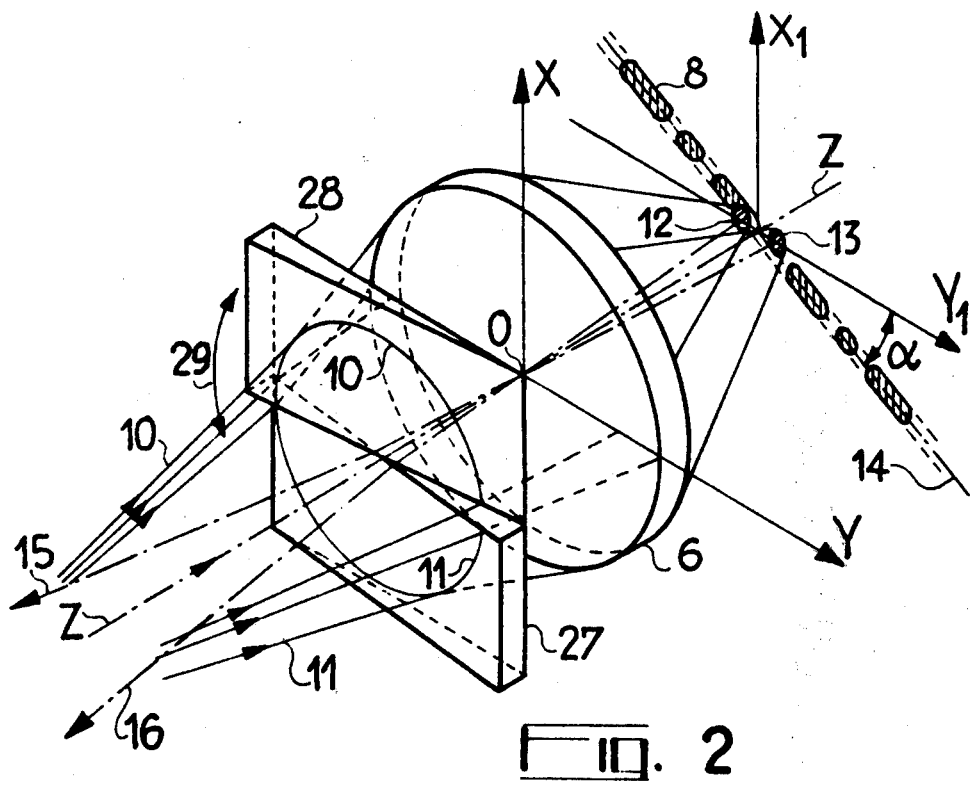
FIG. 2 illustrates a first variant embodiment of the optical read-out system shown in FIG. 1.

It is also possible to eliminate the discrepancy which is due to the field curvature of the objective lens 6, by employing the variant embodiment shown in FIG. 2. In FIG. 2, the main elements of FIG. 1, carrying the same references, are encountered once again. However, the refractive element 5 is replaced by an assembly of two crossed prisms 27 and 28, which respectively receive the two incident half-beams 11 and 10 emitted by the radiation source. The principal faces of the two prisms 27 and 28 form dihedrals the apex lines of which are disposed perpendicularly to the plane YOZ separating them; these prisms deflect the two half-beams 11 and 10 in opposite directions so that the two read-out spots 13 and 12 are displaced symmetrically in relation to the optical axis. Consequently, the two focussing distances obtained as a consequence of the field curvature of the objective lens 6, are the same. The use of crossed prisms makes it possible, each having a small deflection angle, to achieve better separation between the two return beams 15 and 16, since the deflections are additive for each go and return trajectory.

In FIGS. 1 and 2 it can be seen that the read-out spots take an elongated form in the direction OX, because the semicircular apertures effectively forming these spots are halved in said direction OX. To achieve maximum sharpness of read-out of the track, it is desirable that the smallest width of these spots should lie in a direction as close as possible to that of the axis of the track. Under these circumstances, the spots read-out the track signal with spatial shift such that there is no need to use the whole of the reflected radiation in order to produce the read-out signal. It is therefore possible to restrict the system to the utilisation of half the reflected radiation, which yields the read-out efficiency not exceeding 50%.

By accepting a reduction in resolving power, the two spots 12 and 13 can be arranged perpendicularly to the longitudinal axis 14 of the track. In this situation, the read-out efficiency approaches 100% since the two components read-out are in phase and may be added to increase the available signal level.

Figure 3:
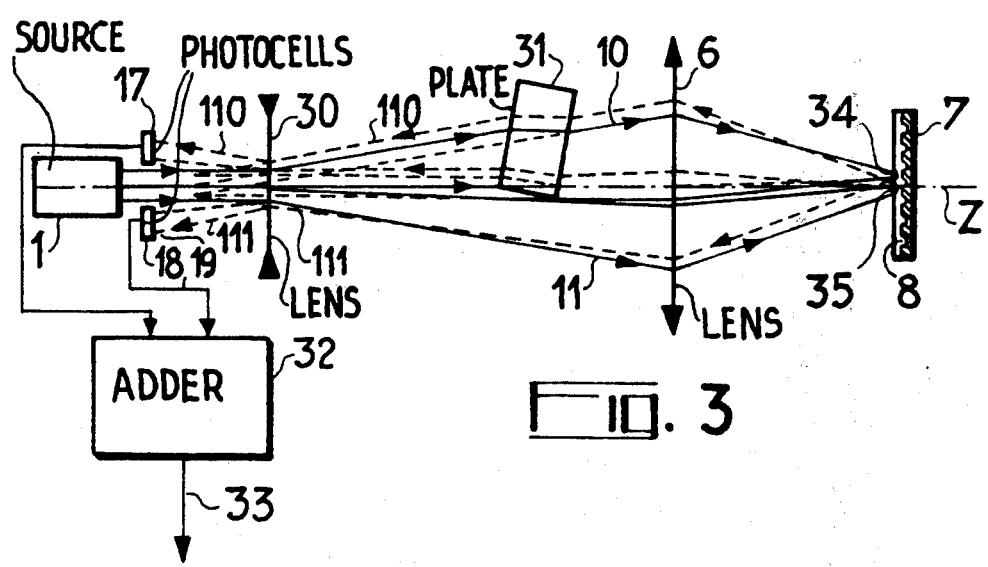
FIG. 3 illustrates a second variant embodiment of the optical read-out system in accordance with the invention.

In FIG. 3, there can be seen a variant embodiment which makes it possible to achieve a read-out efficiency close to 100% together with excellent read-out resolving power.

To this end, instead of using by way of refractive element a prism whose principal faces form a dihedral, it is possible to employ a refractive plate 31 whose principal faces are parallel and are disposed obliquely in relation to the half-beam 10 which passes through them successively.

The read-out head shown schematically in FIG. 3 comprises a radiation source 1 emitting a substantially parallel beam. The beam passes through a divergent lens 30 which converts it into a divergent conical beam of circular section whose phase centre is located on an optical axis Z common to the objective lens 6 and the lens 30.

The top half 10 of the beam emerging from the lens 30 passes obliquely through the plate 31 before illuminating the top half of the aperture of the objective lens 6. Because of the shift experienced by the half-beam 10 on leaving the plate 31, the read-out spot 34 is projected above the axis Z. The other half-beam 11, which does not strike the plate 31, is projected in the form of a second read-out spot 35 located on the optical axis Z. The read-out spots 34 and 35 are aligned in a direction parallel to the plane of the figure and, moreover, their major dimension is in each case disposed in this same direction since the two half-apertures are separated by a diameter perpendicular thereto.

Consequently, with this embodiment, the data carrier 7 is arranged in such a manner that the longitudinal axis of the track 8 is perpendicular to the plane of the figure. The read-out spots 34, 35 straddle a track element and furnish read-out signals which can be additive since there is no longer any spatial shift considering the position of the spots along the track. After reflection at the recorded area of the data carrier 7, two return beams 110 and 111 of substantially semicircular section pass through the divergent lens 30 and then diverge separately towards the photodetector elements 17, 18 19 which have the same function to perform as in the foregoing examples. The adder circuit 32 makes it possible to form the sum of the read-out signals and the sum signal is available at the output 33. Without departing from the scope of the present invention it is also possible, considering FIG. 3, to provide a second plate with parallel faces, intersecting the semi-circular section beam 11. Said second plate must be orientated in such a fashion that the read-out spot 35 is symmetrical with the spot 34 relatively to the optical axis Z.

The use of plates with parallel faces can also be considered as a substitute for the prisms 5, 28 and 27 shown in FIGS. 1 and 2. In the case of FIG. 3, the plate 31 has its principal faces normal to the plane of the figure. By contrast, in the case of FIGS. 1 and 2, it is necessary for the principal faces of the parallel-faced plates to be perpdendicular to the plane XOY which defines the separation between the two half-beams 10 and 11, responsible for the illuminating function. The inclination which the parallel-faced plates should have, relates in all cases to the optical axis Z of the objective lens 6.

FIG. 4 is an isometric view of a third variant embodiment of the reflective optical read-out system. This variant embodiment makes it possible by means of prisms to achieve the highest possible read-out efficiency. To enable the largest scale of drawing to be produced without exceeding the paper format, the left-hand and righthand parts of FIG. 4 have been separated from each other. This separation is symbolised by two brackets connected together by a broken line. The majority of the elements of FIG. 1 are encountered again in FIG. 4 with the same references. In FIG. 4, a mirror 54 pivoting about an axis 55 under the control of an electromechanical transducer 52, has been added. Thanks to this arrangement, the illuminating beam progresses horizontally up to the mirror and, after reflection, is directed vertically towards the data carrier 7 which is read in the horizontal position. Focussing of the objective lens 6 is performed by an electromechanical transducer 53.

In FIG. 4, the refractive element 5 which serves to split the read-out spots, is constituted by a composite two-slope prism which can be separated into two simple elementary prisms 50 and 51. The principal faces of the prisms 50 and 51 form dihedrals whose apex lines parallel to the plane YZ separating the two illuminating half-beams. The dihedrals are open in opposite directions so that the read-out spots 12 and 13 are aligned in the direction X1 and are located off the optical axis Z as FIG. 4 shows. In order to better distinguish the half-apertures of the objective lens 6, that which projects the read-out spot 12 has been cross-hatched. The read-out spots 12 and 13 have an elongated shape making it possible to effect fine read-out of the information carried by the track 8. Since this split read-out is performed without any spatial shift vis-a-vis the longitudinal axis 14, the read-out signals detected by the photodetector elements 17, 18 and 19 are cophasal and can be added. The resultant read-out signal is obtained at the output of an adder circuit 56 supplied with the signal furnished by the photodetector element 17 and the sum of the signals furnished by the photodetector elements 18 and 19. The system shown in FIG. 4 can operate with just one of the two prisms 50 and 51 but in this case it is necessary to take account of the field curvature of the objective lens 6, which may create a focusing error between the spots 12 and 13.

Comparing FIG. 4 with FIG. 1, it will be seen that the return beams 15 and 16 converge on the axis $X_D$ of the detection plane, whereas in FIG. 1, the beams converge on the axis $Y_D$. This difference, of course, results from the change in orientation of the prisms which make up the refractive element 5. This change is clearly apparent if we compare the design of the prisms shown in FIG. 2, with that shown in FIG. 4.

In FIG. 4, the two feed back loops which maintain the focusing and perform the track-following function, have been shown. One of these loops is symbolised by a connection linking the differential amplifier 22 to the electromechanical transducer 53, whilst the other loop is symbolised by a connection linking the differential amplifier 24 to the electromechanical transducer 52.

Throughout the foregoing, examples have been shown in which the optical deflecting element with flat principal planes is an assembly of prisms or plates with parallel faces cut from a refractive material. If the read-out system is already equipped with a prism, self-evidently the optical deflecting element can be associated with said prism. In this case, the prism will have an input or output face constituted by two flat adjacent facets which have opposite obliquities.

Figure 5:
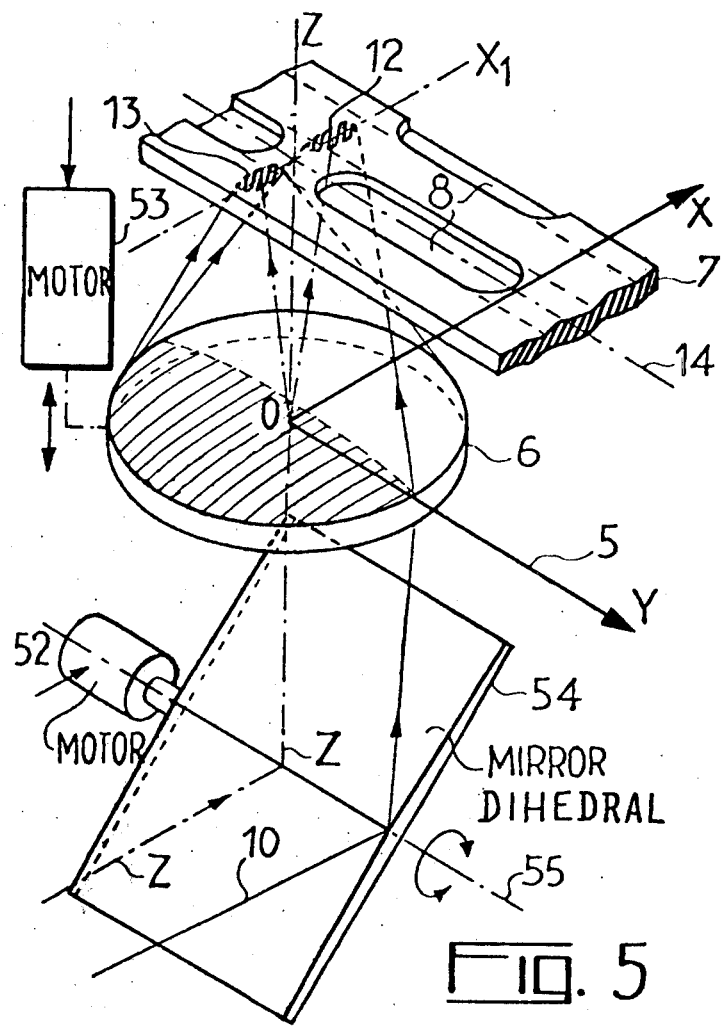
FIG. 5 illustrates a further embodiment of the optical read-out system in accordance with the invention.

If the read-out system is equipped with a mirror, then we have seen that a refractive optical deflecting element may be associated with this in order to split the illumination projected by the objective lens into two separate spots. As illustrated in FIG. 5, it is also possible to arrange for the mirror 54 to perform the function of an optical deflecting element. To this end, the reflective face of the mirror takes the form of a dihedral having an aperture slightly greater or less than 180°. The apex line of the dihedral is located on the optical axis of the projection objective lens. It will be evident that then the principal faces of the optical deflecting element are the faces of the reflective dihedral.

What we claim is:

1. An optical system for the read-out, by reflection, of a data carrier which comprises within a recorded area a track of substantially constant width along which a physical characteristic of said data carrier is modulated in accordance with a signal carrying said information, said system comprising: a radiation source supplying radiation, an objective lens arranged for causing said radiation to converge on said track, photodetector means provided for detecting at least a fraction of said radiation reflected by said recorded area and picked up by said objective lens; said system further comprising: optical deflecting means with flat principal faces, arranged between said radiation source and said objective lens for splitting the illuminating beam delimited by the aperture of said objective lens into halves separated from one another by a plane of section containing the optical axis of said objective lens; said optical deflecting means causing the splitting of the illumination supplied to said recorded area, into two separate read-out spots; said read-out spots, during the transfer of said data carrier, scanning bands which are separated from one another by a distance smaller than said width.

2. An optical system as claimed in claim 1, wherein said optical deflecting means comprise a refractive means.

3. An optical system as claimed in claim 2, wherein said refractive means comprises a first principal face illuminated simultaneously by said halves of the illuminating beam, and two other principal faces illuminated respectively by each of said halves; said first principal face forming with each of said other principal faces, two opposed dihedrals; the apex lines of said dihedrals being normal in relation to the optical axis of said objective lens.

4. An optical system as claimed in claim 2, wherein said refractive means is a prism; the principal faces of said prism forming at least one dihedral; the apex line of said dihedral being normal to the optical axis of said objective lens.

5. An optical system as claimed in claim 2, wherein said refractive means is constituted by at least one plate with parallel faces; said parallel faces being orientated obliquely in relation to the optical axis of said objective lens.

6. An optical system as claimed in claim 2, wherein said refractive means is constituted by two crossed elementary prisms located adjacent to one another through one of their lateral faces, in each case; the principal faces of said elementary prisms forming opposed dihedrals; the apex lines of said dihedrals being normal to the optical axis of said objective lens.

7. An optical system as claimed in claim 1, wherein said optical deflecting means comprises two adjacent parts extending respectively to either side of said plane of section.

8. An optical system as claimed in claim 1, wherein said optical deflecting means is located completely to one side of said plane of section.

9. An optical system as claimed in claim 1, wherein at least one of said read-out spots is displaced by said optical deflecting means in a direction substantially perpendicular to said plane of section.

10. An optical system as claimed in claim 1, wherein said optical deflecting means comprise a reflector element comprising two faces forming a dihedral; the apex line of said dihedral meeting the optical axis of said objective lens.

11. An optical system as claimed in claim 1 wherein at least one of said read-out spots is displaced by said optical deflecting means in a direction substantially parallel to said plane of section.

12. An optical system as claimed in claim 11, wherein said direction of displacement is oblique in relation to the longitudinal axis of said track.

13. An optical system as claimed in claim 11, wherein said direction of displacement is substantially perpendicular to the longitudinal axis of said track.

14. An optical system as claimed in claim 1, wherein said photodetector means comprise two sets of photodetector elements designed in order to pick up the radiation fractions originating respectively from the two zones of said recorded area, which are illuminated by said separate read-out spots; said radiation fractions being picked up by said objective lens after reflection at said recorded area, and at least one of said fractions being directed by said optical deflecting means towards said sets of photodetector elements.

15. An optical system as claimed in claim 14, wherein at least one of said sets comprises two coplanar contiguous photodetector cells; the line separating said photodetector cells being parallel to said plane of section; said one set being associated with a subtracting circuit having two inputs respectively connected to said cells in order to supply a signal representing a focussing error.

16. An optical system as claimed in claim 14, wherein the electrical signals respectively coming from said two sets of photodetector elements are applied to a subtracting circuit in order to furnish a signal representing a track-following error.

17. An optical system as claimed in claim 14, wherein the read-out signal recorded along said track is supplied by at least one of said sets of photodetector elements.

18. An optical system for the read-out, by reflection, of a data carrier which comprises within a recorded area a track of substantially constant width along which a physical characteristic of said data carrier is modulated in accordance with a signal carrying said information, said system comprising: a radiation source supplying radiation, an objective lens arranged for causing said radiation to converge on said track, photodetector means provided for detecting at least a fraction of said radiation reflected by said recorded area and picked up by said objective lens; said system further comprising: optical deflecting means with flat principal faces, arranged between said radiation source and said objective lens for splitting the illuminating beam delimited by the aperture of said objective lens; into halves separated from one another by a plane of section containing the optical axis of said objective lens said optical deflecting means causing the splitting of the illumination supplied to said recorded area, into two separate read-out spots; said read-out spots, during the transfer of said data carrier, scanning bands which are separated from one another by a distance smaller than said width; said system further comprising electromechanical transducer means controlled by feed-back loops, to effect correction of focussing and tracking of said read-out spots; said feed-back loops being fed from said photodetector means.

* * * * *